United States Patent
Gupta et al.

(10) Patent No.: US 11,720,804 B2
(45) Date of Patent: Aug. 8, 2023

(54) DATA-DRIVEN AUTOMATIC CODE REVIEW

(71) Applicant: MICROSOFT TECHNOLOGY LICENSING, LLC., Redmond, WA (US)

(72) Inventors: Anshul Gupta, Kirkland, WA (US); Neelakantan Sundaresan, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 1279 days.

(21) Appl. No.: 16/034,344

(22) Filed: Jul. 12, 2018

(65) Prior Publication Data
US 2019/0228319 A1     Jul. 25, 2019

Related U.S. Application Data

(60) Provisional application No. 62/693,010, filed on Jul. 2, 2018, provisional application No. 62/619,805, filed on Jan. 21, 2018.

(51) Int. Cl.
*G06N 5/025* (2023.01)
*G06F 8/35* (2018.01)
(Continued)

(52) U.S. Cl.
CPC .............. *G06N 5/025* (2013.01); *G06F 8/30* (2013.01); *G06F 8/35* (2013.01); *G06F 8/42* (2013.01);
(Continued)

(58) Field of Classification Search
CPC ..................................................... G06N 5/025
(Continued)

(56) References Cited

U.S. PATENT DOCUMENTS

2009/0327809 A1* 12/2009 Joy ..................... G06F 11/3636
714/E11.026
2010/0153933 A1* 6/2010 Bohlmann ................ G06F 8/73
717/144

(Continued)

FOREIGN PATENT DOCUMENTS

CN         106462802 A      2/2017

OTHER PUBLICATIONS

J. Li, P. He, J. Zhu and M. R. Lyu, "Software Defect Prediction via Convolutional Neural Network," 2017 IEEE International Conference on Software Quality, Reliability and Security (QRS), 2017, pp. 318-328, doi: 10.1109/QRS.2017.42. (Year: 2017).*

(Continued)

*Primary Examiner* — James D. Rutten (57) ABSTRACT

A code review process utilizes a deep learning model trained on historical code reviews to automatically perform peer or code review of a source code file. The deep learning model is able to predict the code reviews relevant to a source code snippet by learning from historical code reviews. The deep learning model is trained on pairs of code snippets and code reviews that are relevant to each other and pairs of code snippets and code reviews that have no relation to each other. The deep learning model is data driven thereby not relying on pre-configured rules which makes the model adaptable to different review environments.

20 Claims, 8 Drawing Sheets

(51) Int. Cl.

| | |
|---|---|
| *G06F 8/73* | (2018.01) |
| *G06F 11/36* | (2006.01) |
| *G06N 5/04* | (2023.01) |
| *G06N 3/045* | (2023.01) |
| *G06N 7/01* | (2023.01) |
| *G06F 8/30* | (2018.01) |
| *G06F 8/41* | (2018.01) |
| *G06F 8/71* | (2018.01) |
| *G06F 8/75* | (2018.01) |
| *G06N 3/08* | (2023.01) |
| *G06N 3/084* | (2023.01) |
| *G06N 3/044* | (2023.01) |

(52) U.S. Cl.
CPC ............... *G06F 8/71* (2013.01); *G06F 8/73* (2013.01); *G06F 8/75* (2013.01); *G06F 11/3604* (2013.01); *G06N 3/045* (2023.01); *G06N 3/08* (2013.01); *G06N 5/04* (2013.01); *G06N 7/01* (2023.01); *G06F 11/3616* (2013.01); *G06N 3/044* (2023.01); *G06N 3/084* (2013.01)

(58) Field of Classification Search
USPC .......................................................... 706/54
See application file for complete search history.

(56) References Cited

U.S. PATENT DOCUMENTS

| | | | | |
|---|---|---|---|---|
| 2010/0241469 | A1* | 9/2010 | Weigert | G06F 11/3604 717/124 |
| 2012/0233159 | A1* | 9/2012 | Datta | G06K 9/6228 707/E17.014 |
| 2014/0149435 | A1* | 5/2014 | Sisman | G06F 11/362 707/751 |
| 2015/0082277 | A1* | 3/2015 | Champlin-Scharff | G06F 11/3664 717/120 |
| 2016/0217404 | A1 | 7/2016 | Ross et al. | |
| 2016/0266896 | A1* | 9/2016 | Fan | G06F 11/36 |
| 2017/0075790 | A1 | 3/2017 | Macleod et al. | |
| 2018/0060733 | A1* | 3/2018 | Beller | G06N 20/00 |
| 2018/0349789 | A1* | 12/2018 | Chen | G06F 8/70 |

OTHER PUBLICATIONS

P. Loyola and Y. Matsuo, "Learning Feature Representations from Change Dependency Graphs for Defect Prediction," 2017 IEEE 28th International Symposium on Software Reliability Engineering (ISSRE), 2017, pp. 361-372, doi: 10.1109/ISSRE.2017.30. (Year: 2017).*

H. Lal and G. Pahwa, "Code review analysis of software system using machine learning techniques," 2017 11th International Conference on Intelligent Systems and Control (ISCO), 2017, pp. 8-13, doi: 10.1109/ISCQ.2017.7855962. (Year: 2017).*

H. Lal and G. Pahwa, "Code review analysis of software system using machine learning techniques," 2017 11th International Conference on Intelligent Systems and Control (ISCO), Coimbatore, India, 2017, pp. 8-13, doi: 10.1109/ISCO.2017.7855962. (Year: 2017).*

W. Xiaomeng, Z. Tao, X. Wei and H. Changyu, "A Survey on Source Code Review Using Machine Learning," 2018 3rd International Conference on Information Systems Engineering (ICISE), Shanghai, China, 2018, pp. 56-60, doi: 10.1109/ICISE.2018.00018. (Year: 2018).*

Ackerman, et al., "Software Inspections: an Effective Verification Process", In Journal of IEEE Software, vol. 6, Issue 3, May 1989, pp. 31-36.

Wang, et al., "Bugram: Bug Detection with N-Gram Language Models", In Proceedings of the 31st IEEE/ACM International Conference on Automated Software Engineering, Sep. 3, 2016, pp. 708-719.

Tsotsis, A, "Meet Phabricator, the Witty Code Review Tool Built Inside Facebook", Retrieved From: https://techcrunch.com/2011/08/07/oh-what-noble-scribe-hath-penned-these-words/, Aug. 8, 2011, 9 Pages.

Allamanis, et al., "A Survey of Machine Learning for Big Code and Naturalness", In Journal of The Computing Research Repository, Sep. 18, 2017, 36 Pages.

Allamanis, et al., "Bimodal Modelling of Source Code and Natural Language", In Proceedings of the 32nd International Conference on Machine Learning, vol. 37, Jul. 6, 2015, pp. 2123-2132.

Allamanis, et al., "Learning to Represent Programs with Graphs", In Journal of The Computing Research Repository, Nov. 1, 2017, 16 Pages.

Bacchelli, et al., "Expectations, Outcomes, and Challenges of Modern Code Review", In Proceedings of the 35th International Conference on Software Engineering, May 18, 2013, pp. 712-721.

Balachandran, V, "Reducing Human Effort and Improving Quality in Peer Code Reviews using Automatic Static Analysis and Reviewer Recommendation", In Proceedings of the 35th International Conference on Software Engineering, May 18, 2013, pp. 931-940.

Bhatia, et al., "Automated Correction for Syntax Errors in Programming Assignments using Recurrent Neural Networks", In Journal of The Computing Research Repository, Mar. 19, 2016, 11 Pages.

Bielik, et al., "Learning a Static Analyzer from Data", In Proceedings of the 29th International Conference on Computer Aided Verification, Jun. 24, 2017, 34 Pages.

Bird, et al., "NLTK: The Natural Language Toolkit", In Proceedings of the 42nd Annual Meeting of Association for Computational Linguistics, Jul. 21, 2004, 4 Pages.

Boehm, et al., "Software Defect Reduction Top 10 List", In Journal of Software Engineering: Barry W. Boehm's Lifetime Contributions to Software Development, Management, and Research, vol. 34, Issue 1, Jan. 2001, 135-137.

Campbell, et al., "Syntax Errors Just Aren't Natural: Improving Error Reporting with Language Models", In Proceedings of the 11th Working Conference on Mining Software Repositories, May 31, 2014, pp. 252-261.

Fagan, M E., "Design and Code Inspections to Reduce Errors in Program Development", In Journal of IBM Systems, vol. 15, Issue 3, Sep. 1976, pp. 182-211.

Gers, et al., "Learning to Forget: Continual Prediction with LSTM", In Ninth International Conference on Artificial Neural Networks, Sep. 7, 1999, 19 Pages.

Gomes, et al., "An Overview on the Static Code Analysis Approach in Software Development", Retrieved From: http://citeseerx.ist.psu.edu/viewdoc/download?doi=10.1.1.734.6506&rep=rep1&type=pdf, 2008, 16 Pages.

Iyer, et al., "Summarizing Source Code Using a Neural Attention Model", In Proceedings of the 54th Annual Meeting of the Association for Computational Linguistics, vol. 1, Aug. 7, 2016, pp. 2073-2083.

Karpathy, et al., "Deep Visual-Semantic Alignments for Generating Image Descriptions", In Proceedings of the IEEE Conference on Computer Vision and Pattern Recognition, Jun. 7, 2015, pp. 3128-3137.

Kennedy, N, "How Google Does Web-Based Code Reviews with Mondrian", Retrieved From: https://engtech.wordpress.com/2006/12/01/how-google-does-web-based-code-reviews-with-mondriani, Dec. 1, 2006, 3 Pages.

Kingma, et al., "Adam: A Method for Stochastic Optimization", In Journal of the Computing Research Repository, Dec. 22, 2014, 9 Pages.

Mantyla, et al., "What Types of Defects are Really Discovered in Code Reviews?", In Proceedings of the IEEE Transactions on Software Engineering, vol. 35, Issue 3, May 2009, pp. 430-448.

Mikolov, et al., "Distributed Representations of Words and Phrases and their Compositionality", In Proceedings of the 27th Annual Conference on Neural Information Processing Systems, Dec. 5, 2013, pp. 3111-3119.

(56) References Cited

OTHER PUBLICATIONS

Rabinovich, et al., "Abstract Syntax Networks for Code Generation and Semantic Parsing", In Journal of The Computing Research Repository, Apr. 25, 2017, 11 Pages.
Sadowski, et al., "Tricorder: Building a Program Analysis Ecosystem", In Proceedings of the 37th International Conference on Software Engineering, vol. 1, May 16, 2015, pp. 598-608.
Shang, et al., "Automated Phrase Mining from Massive Text Corpora", In Journal of The Computing Research Repository, Mar. 11, 2017, 11 Pages.
Srivastava, et al., "Dropout: A Simple Way to Prevent Neural Networks from Overfitting", In Journal of Machine Learning Research, vol. 15, Issue 1, Jan. 2014, pp. 1929-1958.
Sutskever, et al., "Generating Text with Recurrent Neural Networks", In Proceedings of the 28th International Conference on Machine Learning, Jun. 28, 2011, pp. 1017-1024.
Gupta, et al., "Intelligent code reviews using deep learning", In Proceedings of the 24th ACM SIGKDD International Conference on Knowledge Discovery & Data Mining, Aug. 20, 2018, 09 Pages.
Nijessen, Rik, "A Case for Deep Learning in Mining Software Repositories", In Master Thesis of Delft University of Technology, Nov. 10, 2017, 57 Pages.
"International Search Report and Written Opinion Issued in PCT Application No. PCT/US19/013415", dated Apr. 26, 2019, 14 Pages.
"Office Action Issued in European Patent Application No. 19703818.5", dated Feb. 1, 2023, 9 Pages.

* cited by examiner

```
200 —
202 — +import a,b
204 — +def test_model_1(b,a,c,d) : # this is a test function
206 — +X=1
208 — +X1=X+1
210 — +
212 — +if X1==2
214 — + print('hello')
216 — +# print(1)
218 — +return True
```

FIG. 2B

```
220 —
202 — +import a,b                                    [Add a blank line] 222
204 — +def test_model_1(b,a,c,d) : # this is a test function
206 — +X=1              [Add space after ","] 224
208 — +X1=X+1           [No space before and after ":"] 226
210 — +
212 — +if X1==2         [Remove blank line] 228
214 — + print('hello')
216 — +# print(1)
218 — +return True
```

DATA-DRIVEN AUTOMATIC CODE REVIEW

CROSS-REFERENCE TO RELATED APPLICATION

This application claims the benefit of U.S. Provisional Application No. 62/619,805 filed on Jan. 21, 2018 and U.S. Provisional Application No. 62/693,010 filed on Jul. 2, 2018.

BACKGROUND

Peer or code review is a process that is often utilized during software development where source code is reviewed by one or more peers of a developer. The source code is often inspected to discover errors, to ensure that the source code complies with best practice standards and to discover vulnerabilities, such as race conditions, malware, memory leaks, buffer overflows, format string exploits, and the like. Code review is used to find these problems which may have been overlooked in the development of the source code before the software is released. In some situations, code review is performed manually thereby consuming the time and efforts of the reviewers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An automatic code review process utilizes a deep learning model that learns, from past or historical code reviews, the patterns of source code that are associated with a code review. The deep learning model is data-driven thereby relying on the patterns in source code snippets that have been changed to learn the relevant code reviews for a particular source code snippet. The historical code reviews are obtained from a shared source code repository that contains pull requests. The pull requests seek collaborators of a project to review source code changes made to correct a bug fix or add new source code in one or more source code files. The collaborators review the submitted changes and add comments explaining the changes made to a source code file or added to a source code file which are used as the historical code review.

A knowledge base is generated from the shared source code repository that includes a code snippet and its corresponding code review. The code snippet and code review pairs are used to generate relevant and non-relevant datasets that train the deep learning model. A relevant dataset includes a source code snippet, its surrounding syntactic context, and its corresponding historical code review and a non-relevant dataset includes a source code snippet, its surrounding syntactic context, and a code review that is not relevant to the source code snippet.

Once trained and tested, the deep learning model is then used to generate a probability score that indicates a likelihood that one or more code reviews are relevant to a particular code snippet. The more relevant code reviews are then selected and used to identify the areas in the source code that require additional attention.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The subject matter disclosed pertains to a data-driven automatic technique for performing code review. The automatic code review process utilizes a deep learning model that learns, from past or historical code reviews, those code reviews that are relevant to a particular code snippet. The deep learning model is trained from features that include the input code snippet, its syntactic context and historical code reviews. The features are transformed into tokens and then into an encoded representation through the use of individual long short-term memory networks. The encoded representations are combined into a single feature vector and used to train a deep learning model to learn associations between the source code statements in the input code snippet and its syntactic context and relevant code reviews. The deep learning model is trained to compute a probability score indicating a likelihood that a particular source code snippet is associated with a particular code review. Those code reviews having a probability score deemed relevant to the particular source code snippet are selected and presented to the end user (e.g., programmer, developer, reviewer, user, etc.)

Attention now turns to a further discussion of the system, devices, components, and methods utilized in the data-driven code review.

System

Figure 1:
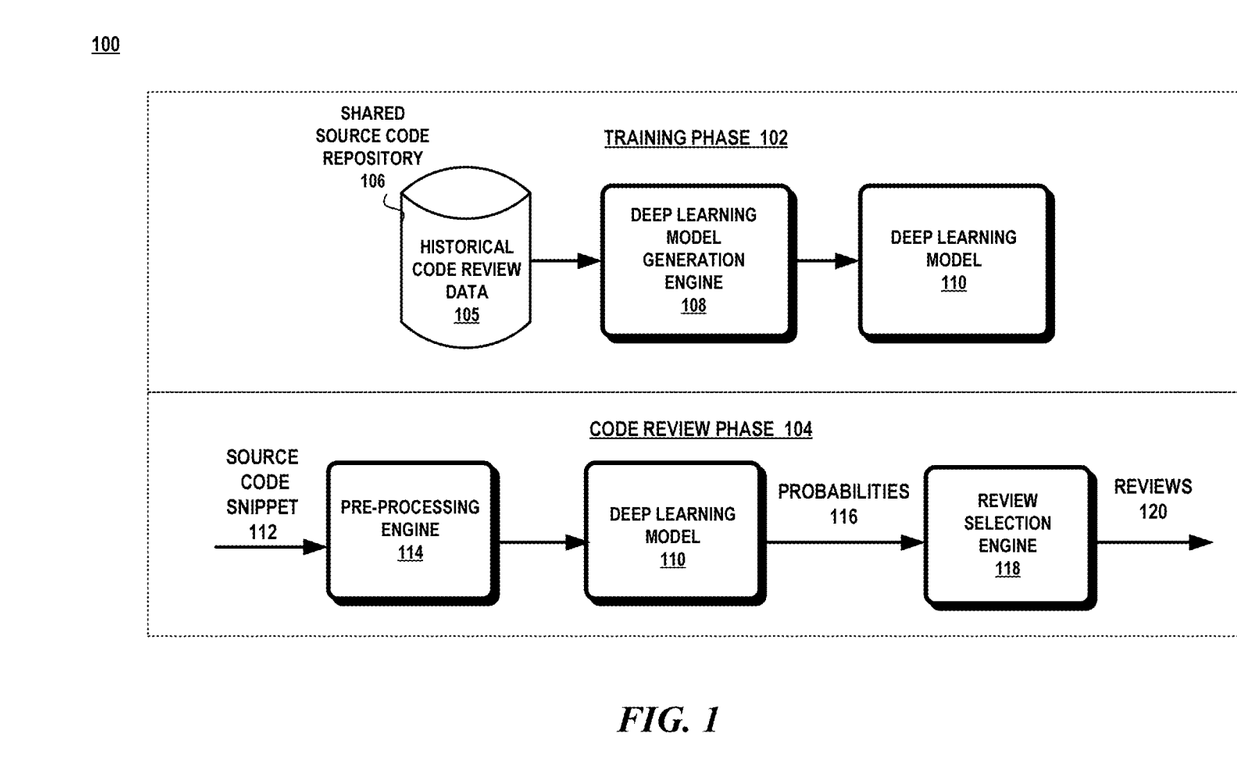
FIG. 1 illustrates an exemplary system for training a deep learning model and utilizing the deep learning model for automatically performing code reviews.

FIG. 1 illustrates a block diagram of an exemplary system 100 in which various aspects of the invention may be practiced. As shown in FIG. 1, system 100 includes a training phase 102 which trains a deep learning model 110 and a code review phase 104 that utilizes the deep learning model 110 to automatically review code snippets.

In the training phase 102, a deep learning model generation engine 108 trains and tests the deep learning model 110 from historical code review data 105 that may be obtained from a shared source code repository 106. The deep learning model 110 learns patterns of code that correspond to certain code reviews. The historical code review data 105 may be obtained from pull requests. A pull request allows a developer to inform others about changes made to one or more source code files that have been pushed to the shared source code repository. These changes may have been related to a bug fix or due to a new feature. Once the pull request is open, others may review the change, comment about the change, and make additional changes to the original change before the source code file is committed to the shared source code repository.

The deep learning model 110 can be trained for any programming language given the pull requests for that programming language. In some situations, the deep learning model 110 may be trained for a particular software project or for software developed from a particular development team, etc.

Deep learning is a set of techniques for training neural networks. Deep learning is a subset of machine learning which uses a cascade of layers for feature extraction and transformation. Deep learning refers to the multiple layers the training data is processed and transformed into the output. Deep learning differs from machine learning techniques such as linear regression, K-means, decision trees, random forest, support vector machines, native bayes classifier, boosted classification trees, and nearest neighbor classifier. Deep learning models include artificial neutral networks (ANN), recurrent neural networks (RNN), deep belief networks, and deep boltzmann machines.

The training phase 102 obtains the training data from a shared source code repository 106. The shared source code repository 106 is a file archive and web hosting facility that stores large amounts of artifacts, such as source code files and the code base. Programmers (i.e., developers, users, end users, etc.) often utilize a shared source code repository 106 to store source code and other programming artifacts that can be shared among different programmers. A programming artifact is a file that is produced from a programming activity, such as source code, program configuration data, documentation, and the like. The shared source code repository 106 may be configured as a source control system or version control system that stores each version of an artifact, such as a source code file, and tracks the changes or differences between the different versions. Repositories managed by source control systems are distributed so that each user of the repository has a working copy of the repository. The source control system coordinates the distribution of the changes made to the contents of the repository to the different users.

In one aspect, the shared source code repository 106 is implemented as a cloud or web service that is accessible to various programmers through online transactions over a network. An online transaction or transaction is an individual, indivisible operation performed between two networked machines. A programmer may check out an artifact, such as a source code file, and edit a copy of the file in its local machine. When the user is finished with editing the source code file, the user performs a commit which checks in the modified version of the source code file back into the shared source code repository. A pull request informs others that changes have been made to one or more file which were pushed or committed back into the repository. The term pull request is a well-known term of art associated with GitHub.

A shared source code repository 106 may be privately accessible or publicly accessible. There are various types of shared source code repositories, such as without limitation, GitHub, BitBucket, CloudForge, ProjectLocker, GitHub, SourceForge, LaunchPad, etc., and any one or combination thereof may be used herein.

In the code review phase 104, the deep learning model 110 automatically analyzes a source code snippet 112 to determine the relevance of a review to the source code snippet 112. A probability score 116 is calculated for each of the reviews provided to the deep learning model 110. The code review phase 104 may include a pre-processing engine 114 that transforms the source code snippet 112 into a form recognizable by the deep learning model 110. The source code snippet 112 is one or more lines of source code in a particular programming language and may include the entire source code file. The source code snippet 112 may come from the same code base that trained the deep learning model 110 and in other aspects, the source code snippet 112 may not be from the same code base.

The deep learning model generates probabilities 116 for each of the reviews that are similar to the features of the source code snippet 112. A code review or review 120 is information that describes a reason why one or more lines of code are not compliant with the code review process. The code review process may be based on best practice standards, errors, vulnerabilities, such as race conditions, malware, memory leaks, buffer overflows, format string exploits, and/or mistakes overlooked in the development of the source code. A probability 116 represents the relevance of a review to the source code snippet 112. The review selection engine 118 selects one or more reviews based on a policy or objective which is then output 120. A developer may utilize the reviews to focus more attention on the areas identified by the reviews.

The various aspects of the system 100 may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an aspect is implemented using hardware elements and/or software elements may vary in accordance with any number of factors, such as desired computational rate, power levels, bandwidth, computing time, load balance, memory resources, data bus speeds and other design or performance constraints, as desired for a given implementation.

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention.

Figure 2A:
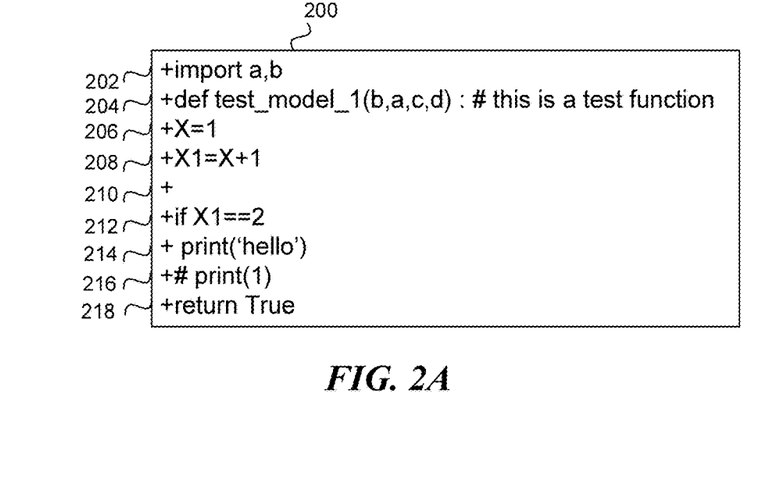
FIGS. 2A and 2B illustrate an exemplary output of a code review process.
Figure 2B:
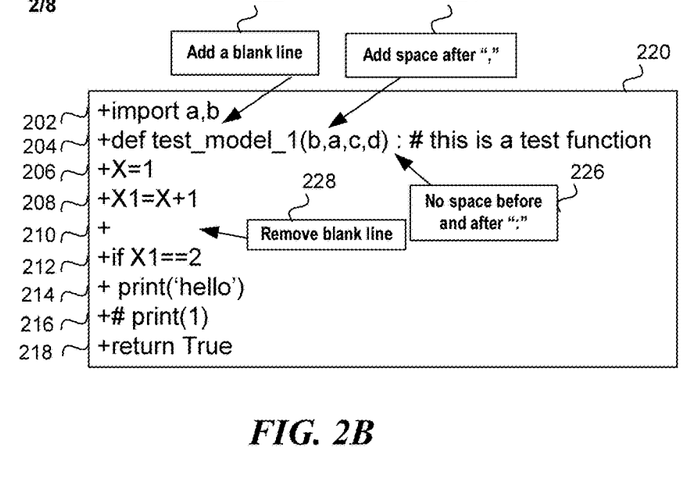

Referring to FIG. 2A, there is shown an exemplary source code program 200 written in the Python programming language. The source code program 200 contains source code lines 202 through 218. FIG. 2B shows the exemplary source code program shown in FIG. 2A having been reviewed by the deep learning model. The source code program 220 contains various reviews shown in labeled boxes 222-228. Each review contains a comment that indicates a potential issue with the code snippet.

As shown in FIG. 2B, review 222 indicates that a blank line needs to be inserted after line 202. Review 224 indicates that a space needed to be inserted between after the first comma in line 204. Review 226 indicates that there is no space after the colon in line 204. Review 228 indicates that a blank line needs to be removed at line 210. These reviews 222-228 are learned automatically by the deep learning model using historical code reviews without incurring any manual effort.

Figure 3:
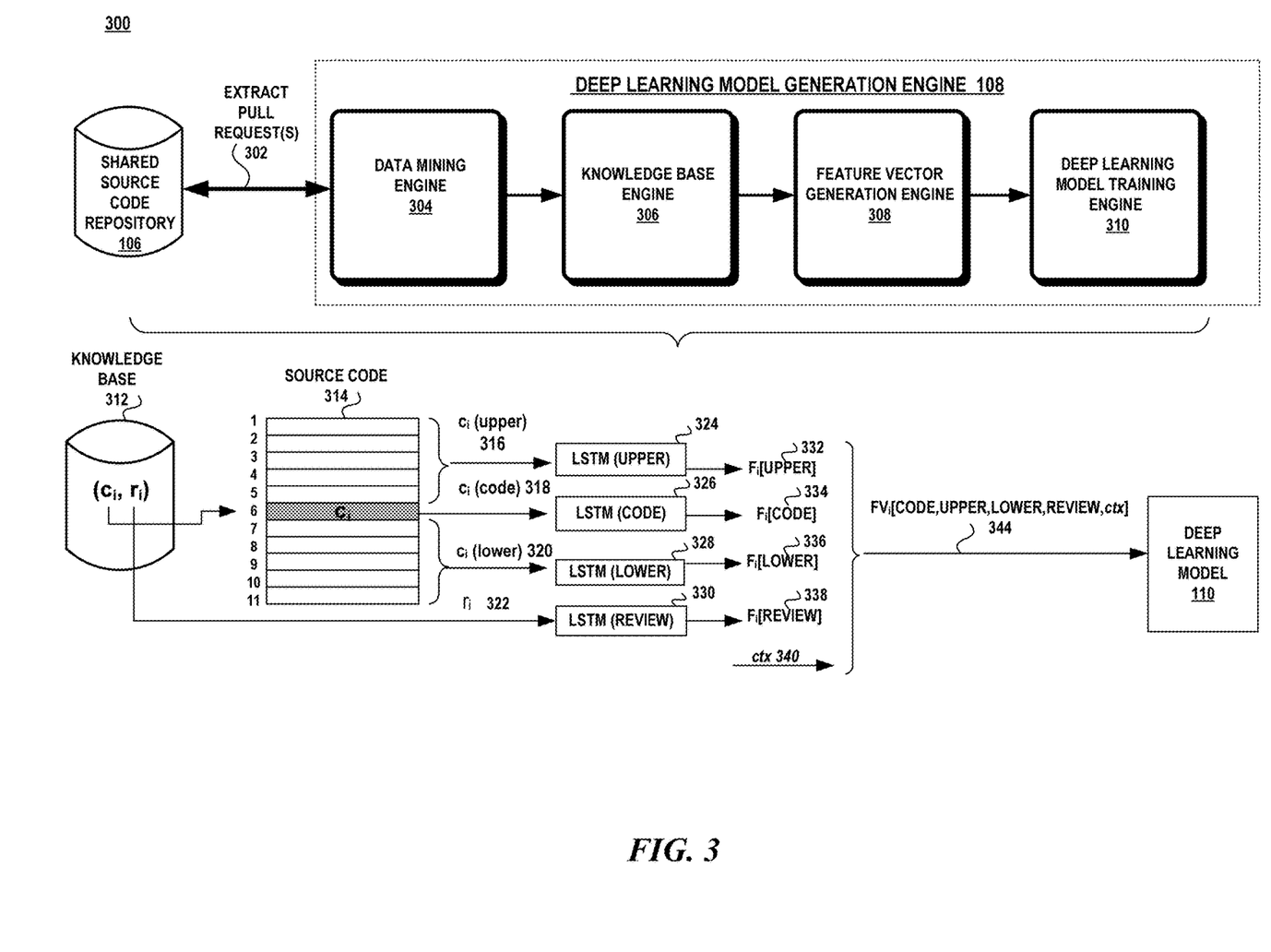
FIG. 3 is a schematic diagram illustrating an exemplary configuration of the deep learning model generation engine.

Attention now turns to a further description of the deep learning model generation engine. Turning to FIG. 3, in one aspect, the deep learning model generation engine 108 may be composed of a data mining engine 304, a knowledge base engine 306, a feature vector generation engine 308 and a deep learning model training engine 310. The data mining engine 304, knowledge base engine 306, feature vector generation engine 308 and deep learning model training engine 310 may be a sequence of computer program instructions, that when executed by a processor, causes the processor to perform methods and/or operations in accordance with a prescribed task. These engines 304-310 may be implemented as program code, programs, procedures, modules, components, code segments, program stacks, middleware, firmware, methods, routines, and so on. These engines 304-310 may be implemented according to a predefined computer language, manner or syntax, for instructing a computer to perform a certain function. The instructions may be implemented using any suitable high-level, low-level, object-oriented, visual, compiled and/or interpreted programming language.

The data mining engine 304 extracts data from the shared source code repository 106 to train the model. The data mining engine 304 searches for pull requests of a particular code base where the pull request indicates a change having been made to a source code file identified in the pull request. From the comments related to the pull request, the data mining engine 304 can identify which part of a source code file has been reviewed. The data mining engine 304 may obtain three versions of such a source code file: an initial version before the review; a second version which has been reviewed; and a third version which shows the changes made in response to a code review. The data mining engine 304 uses the second and third versions of the source code file. The second version provides samples of code snippets having a review and the third version provides samples of code snippets not having a review.

The knowledge base engine 306 generates a knowledge base of pairs of training data 312. A pair of training data includes a code snippet $c_i$ and its associated review, $r_i$. The knowledge base engine 306 extracts from the source code file 314 for each code snippet, $c_i$, the actual code snippet, $c_i$(code) 318, an upper context, $c_i$ (upper) 316, a lower context, $c_i$ (lower) 320, and the corresponding review $r_i$ 322 which is stored in the knowledge base 312. The actual code snippet $c_i$(code) 318 may span one or more lines of source code. The upper and lower context represent the syntactic context of the code snippet which the deep learning model uses to learn patterns of code that are associated with a particular review. The upper context 316 is the source code immediately preceding the code snippet and the lower context 320 is the source code immediately succeeding the code snippet.

As shown in FIG. 3, the upper context 316 includes the five lines of code immediately preceding the actual code snippet 318 and the lower context 320 includes the five lines of code immediately succeeding the actual code snippet. However, it should be noted that the subject matter disclosed herein is not limited to any particular configuration of lines of code for the upper and lower contexts and that other configurations are possible.

The knowledge base 312 includes diverse reviews and frequently given reviews. Diverse reviews belong to different types of coding issues and frequently given reviews appear often. The reviews in the knowledge base are categorized into clusters that are labeled with a corresponding type. In one aspect, the types may include best practices, format related, member property field related, variable check, exception related, thread related, and code refactor. There can be subclasses with each type. The reviews in these clusters are selected based on a relevance score which is discussed in more detail below.

The source code snippet, the upper context, the lower context and the review are transformed into a sequence of tokens. A tokenizer can be used to parse the source code statements into a sequence of tuples consisting of a token name and a value. The sequence of tuples is then transformed into a sequence of token values. The reviews are transformed into a sequence of tokens using a tweet tokenizer or other natural language processing tool.

For example, a code snippet may be represented as a sequence of code tokens $c_i(\text{code}) \rightarrow (c_1^i, c_2^i, \ldots, c_n^i)$, the upper context may be represented as a sequence of code tokens $c_i(\text{upper}) \rightarrow (c_1^i, c_2^i, \ldots, c_m^i)$, the lower context may be represented as a sequence of code tokens $c_i(\text{lower}) \rightarrow (c_1^i, c_2^i, \ldots, c_l^i)$, and the review may be represented as a sequence of code tokens $r_i \rightarrow (r_1^i, r_2^i, \ldots, r_p^i)$, where n is the number of tokens in the code snippet, m is the number of tokens in the upper context, l is the number of tokens in the upper context, and p is the number of tokens in the review.

The sequences of tokens are converted into an n-dimensional real valued vector or embedding vector. The embedding vector is a dense representation of words that capture the sematic relations between tokens. The mapping from the code tokens to an embedding vector is represented mathematically as follows:

$T_{code} \in (c_j^i \rightarrow ec_j^i)$; $j \in [0, n]$, $T_{upper} \in (c_j^i \rightarrow ec_j^i)$; $j \in [0, n]$, $T_{lower} \in (c_j^i \rightarrow ec_j^i)$; $j \in [0, n]$, $T_{review} \in (r_k^i \rightarrow er_k^i)$; $k \in [0, p]$, where n is the size of the code token vocabulary, p is the size of the review token vocabulary, $ec \in R^{H_c}$ and $er \in R^{H_c}$ are respective embedding vectors and $H_c$ and $H_R$ are embedding dimensionality.

The feature vector generation engine 308 consists of four neural networks 324-330 that are used to generate four features from each code snippet, $c_i$. The four features include the code snippet $F_i[\text{CODE}]$ 334, the lower context $F_i[\text{LOWER}]$ 336, the upper context $F_i[\text{UPPER}]$ 332, and the review $F_i[\text{REVIEW}]$ 338.

In one aspect, the four neural networks 324-330 are long short-term memory networks (LSTM). A LSTM is a type of recurrent neural network (RNN) that is a capable of learning order dependence in sequence prediction problems. The four LSTMs are used to differentiate the different features that have an impact on a code review. A code review may not pertain to a particular source code statement but may result from the immediately preceding and/or following code sections. Each of the LSTMs transforms a respective portion of the source code into a representation that is used by the deep learning model in learning the importance of that feature on the review.

In some cases, the review may not contain enough information for the model to learn whether or not the review is applicable to a code snippet. In these cases, a code context, cxt 340, is injected, by the feature vector generation engine 308, into the feature vector 344 to assist the deep learning model to learn the review's applicability. To extract the code context, cxt, the review comments are aligned to code tokens in the source code snippet to extract a unique set of token names that appear in the line where the review is given and its neighboring source code lines. The code context, cxt, provides additional context to associate a review with source code statements. The code context is a binary vector of a size equal to the possible unique token names. Each token in cxt is mapped to a location in the binary vector and the value of the binary vector is set to 1. The vector, cxt, will have a value of "1" at all locations corresponding to the tokens in ctx and the value "0" otherwise.

All of the features, 322-340, are then combined to produce a feature vector 344 that is used by the deep learning model training engine 310 to learn the relevance of the feature associated with a code snippet to a code review.

In one aspect, the deep learning model 110 is a feed forward neural network whose output layer has a fixed size of two neurons, relevant and non-relevant, with Softmax activation, which outputs a relevance score between [0,1]. Softmax is a normalized exponential function that transforms a vector of real values into a probability distribution having normalized values with the range [0,1].

The relevant and non-relevant neurons are trained from a dataset of relevant tuples of code snippets and reviews and a dataset of non-relevant tuples of code snippets and reviews. The pairs of code snippets and reviews from the historical code review data consist of relevant tuples since the review is associated with the code snippet and hence relevant to the code snippet. The non-relevant tuples are generated from selectively sampling the reviews from the historical code reviews and pairing them with code snippets that are not associated with the historical code review. The relevant and non-relevant datasets of training data is used to train the deep learning model to learn when a code review is associated with a code snippet and when a code review is not associated with a code snippet.

In one aspect, the deep learning model is trained using back propagation to tune the parameters of the pretrained embeddings, LSTMs, and the combined feedforward neural network. The Adam optimizer algorithm is used to minimize the cross-entropy objective on the training datasets. The Adam optimizer is a first order gradient-based stochastic optimization technique that is based on adaptive estimates of lower-order moments. The dropout technique is used to prevent overfitting in the LSTM layers. Dropout is a regularization technique for neural networks that ignores randomly selected neurons during training. Class weights are then added to force the deep learning model to learn from imbalanced datasets of relevant and non-relevant code snippets and review pairs.

Hence, the deep learning model may be represented mathematically as computing a relevance score $S_{relevance}$ as follows:

$$S_{relevance} = FV(c_i(\text{upper}), c_i(\text{code}), c_i(\text{lower}), ctx, r_i),$$

where $S_{relevance} \propto \text{Softmax}(W_f A)$, $$A = \text{Relu}(W_1 e_{upper}, |e_{code}|e_r|ctx) | \text{Relu}(W_2 e_{upper}, |e_{code}|e_r|ctx),$$

$$e_{upper} = \text{LSTM(upper)}(T_{upper}[c_i(\text{upper})]),$$

$$e_{lower} = \text{LSTM(lower)}(T_{lower}[c_i(\text{lower})]),$$

$$e_{code} = \text{LSTM(code)}(T_{code}[c_i(\text{code})]),$$

$$e_{review} = \text{LSTM(review)}(T_{review}[r_i]),$$

| is the concatenation operator; $c_1$ (code), $c_i$ (upper), $c_i$ (lower) are sequences of code sequences; $r_i$ is a sequence of review tokens; i represents the $i^{th}$ code snippet and review pair in T; ctx is the code context; $W_1$, $W_2$, $W_f$ are weight matrices for the feed forward neural network; $e_{upper}$, $e_{lower}$, $e_{code}$, $e_{review}$ are the encoded outputs of the LSTMs; and $T_{code}$, $T_{lower}$, $T_{upper}$, $T_{review}$ are the code to embedding mapping functions.

Figure 4:
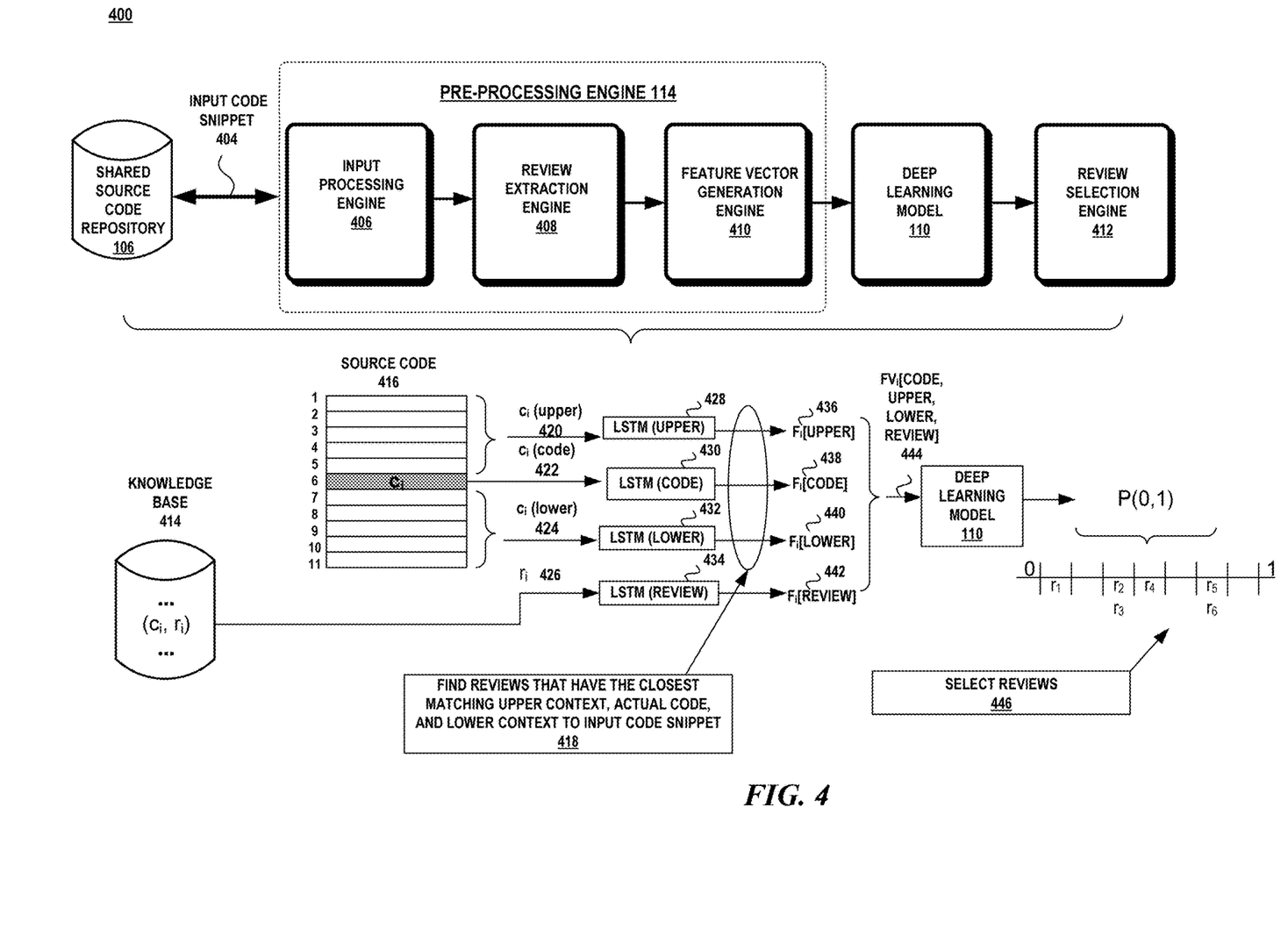
FIG. 4 is a schematic diagram illustrating an exemplary configuration of a code review process using the deep learning model generation engine.

Attention now turns to a more detailed description of the components used in the code review process. Turning to FIG. 4, the code review process 400 includes an input processing engine 406, a review extraction engine 408, a feature vector generation engine 410, the deep learning model 110, and a review selection engine 412.

When a new pull request is received in a shared source code repository, it may include new source code file or modifications to existing source code files in the repository. The input processing engine 406 may segment the source code file 416 into smaller-sized code snippets (e.g., 11-line code snippets). For each input code snippet $c_i$(code) 404, 422 the input processing engine 406 obtains the corresponding upper context $c_i$(upper) 420 and lower context $c_i$(lower) 424. Encoded representations of $c_i$(code), $c_i$(upper), $c_i$(lower) are generated by a respective LSTM 430-434.

Next, the review extraction engine 408 obtains reviews for this code snippet from the knowledge base 414 that closely match the input code snippet 404 (block 418). For each code snippet in the knowledge base, $c_i$, the review extraction engine 408 compares its corresponding upper context, lower context, and source code with the upper context, lower context and source code of the input source code snippet. The comparison may utilize a cosine similarity test. The reviews of those code snippets in the knowledge base that closely matches the upper context, lower context and source code of the input code snippet are then used in the feature vector that is passed to the deep learning model.

A cosine similarity test compares a vector representing the input code snippet with a vector representing a code snippet from the knowledge base. The cosine similarity test may be represented mathematically as $$\cosine \theta = \frac{a \circ b}{\|a\| \|b\|},$$

where a, b are the two vectors being compared. The cosine similarity test is a standard technique for quantifying the similarity between two vectors in information retrieval and is a robust way of comparing a high dimensional sparse vector.

The feature vector generation engine 410 then utilizes four LSTMs, 428-434, to generate corresponding encoded representations of the features from the input code snippet, its corresponding upper context, a corresponding lower context, and the reviews extracted from the knowledge base. The output from the LSTMs 436-442 is then assembled into a feature vector FV[CODE, UPPER, LOWER, REVIEW] 444. The feature vector 444 is input into the deep learning model 110 which predicts whether a review is relevant to the input code snippet.

The deep learning model associates a probability for each review within the range [0,1]. In one aspect, the most relevant reviews are selected by the review selection engine 412. A threshold is set to find the most applicable reviews to the input code snippet. To select a threshold, a probability score, $S_{relevance}$, is computed for all code and review pairs.

A 90% confidence interval for $S_{relevance}$, is computed for each cluster. The threshold for a cluster is chosen as the upper limit of the confidence interval which serves as a basis from which to select the more relevant reviews. In another aspect, the review selection engine 412 may select reviews from different probability bands (block 446). The reviews are then presented to the target audience.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 5:
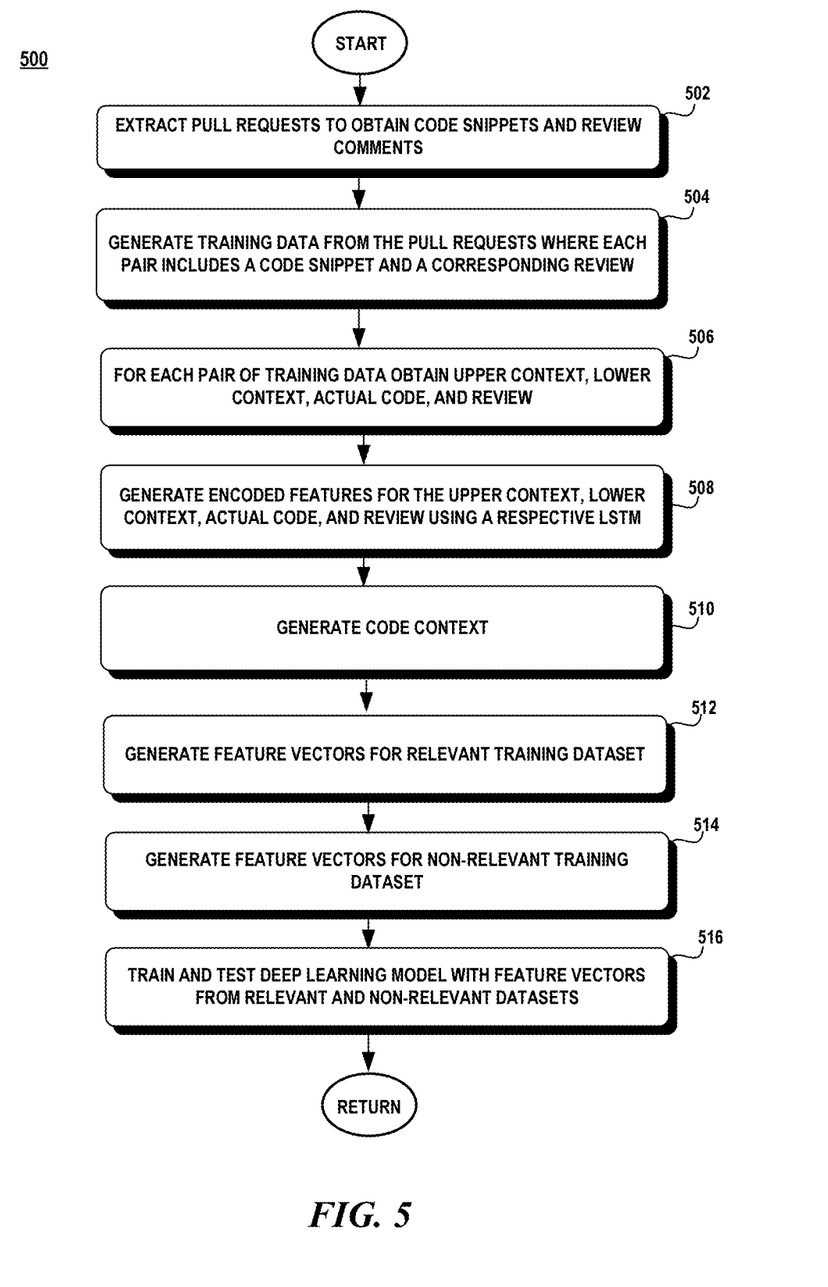
FIG. 5 is a flow diagram illustrating an exemplary method for training the deep learning model.

FIG. 5 is a flow chart illustrating an exemplary method 500 for training a deep learning model to automatically review source code. The method 500 extracts pull requests from a shared source code repository where the pull requests include source code files that have been altered due to a business need or bug fix (block 502). Source code snippets and their corresponding code review are obtained from the pull request (block 504). For each code review pair, its corresponding upper context, lower context and review are obtained (block 506). The code snippet, lower context, upper context, and review are input into a respective neural network (e.g., LSTM) to generate a corresponding encoded representation of each of these features (block 508). In some cases, an additional code context may be generated (block 510). The features are then assembled into a feature vector.

Those feature vectors based on reviews from a pull request are considered part of the relevant training dataset (block 512). A non-relevant training dataset is constructed as described above (block 514). The relevant and non-relevant training datasets are used to train and test the deep learning model until the training achieves a certain performance threshold (block 516).

Figure 6:
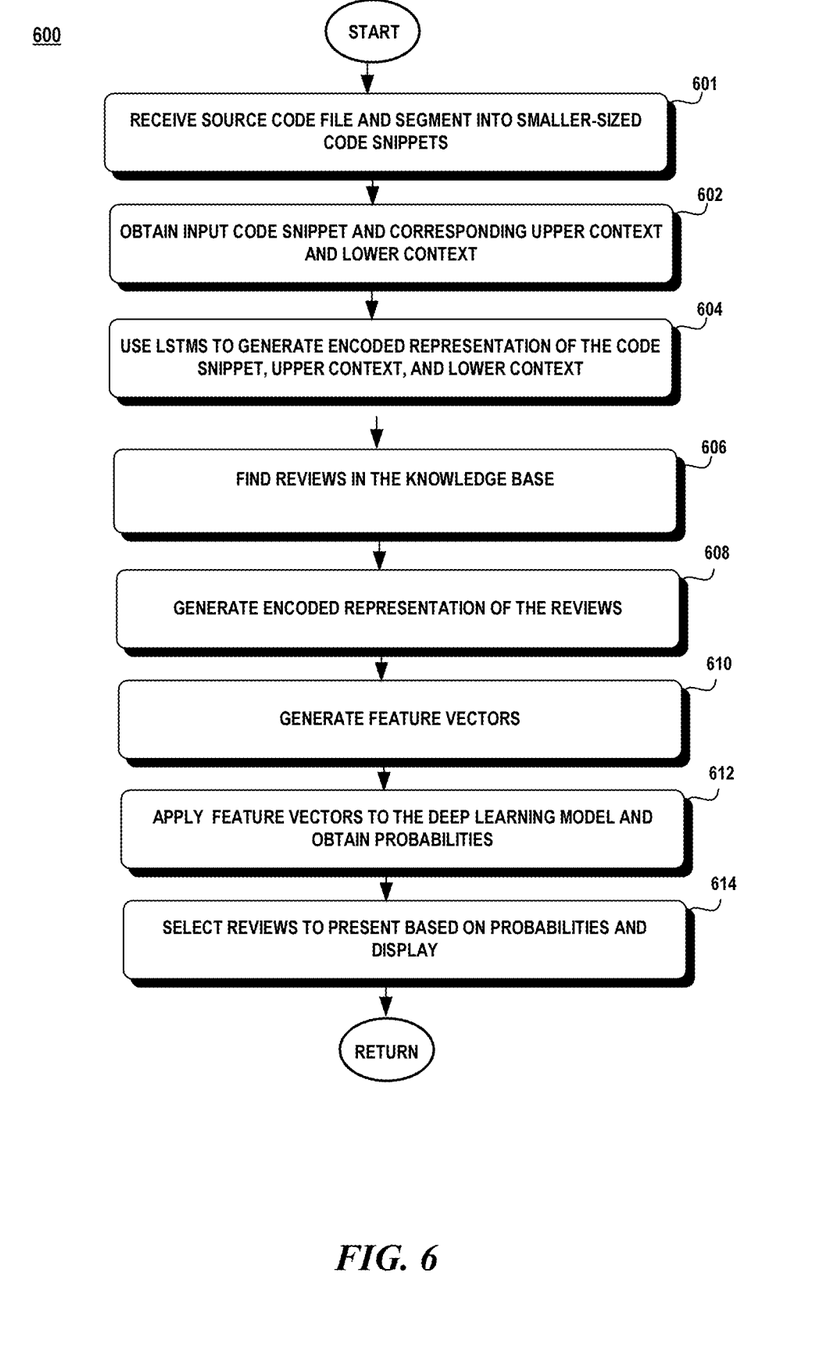
FIG. 6 is a flow diagram illustrating an exemplary method of the code review process.

FIG. 6 is a flow chart illustrating an exemplary method 600 for automatically reviewing source code. The method receives a source code file which is segmented into smaller-sized code snippets (block 601). The code snippet and its corresponding upper context and lower context are obtained (block 602). An encoded representation of the input code snippet, upper context, and lower context is generated through a respective neural network (e.g. LSTM) (block 604). The knowledge base is searched for code reviews having closely matching source code, lower context and upper context as the input code snippet (block 606).

The code snippet is paired with each of the reviews closely matching the features of the code snippet into respective LSTMs to generate encoded representation of the features (block 608). The encoded representations of the code snippet, upper context, lower context, and review are then combined into a single feature vector (block 610) which is then input into the deep learning model (block 612). The deep learning model generates a probability for each review indicating the likelihood of the relevance of the review to the code snippet (block 612). Reviews are then selected based on the probability score and a target objective (block 614).

The reviews may be presented in any visual manner (block 614). In one aspect, a review may be placed inline in close proximity to the affected source code snippet as shown in FIG. 2B. However, the subject matter disclosed is not limited to a particular manner to display a recommendation and other ways of displaying the review and the affected source code snippet may be used.

Technical Effect

Aspects of the subject matter disclosed herein pertain to the technical problem of automatically reviewing source code. The technical features associated with addressing this problem is a deep learning model that learns, from historical review data, the patterns of source code that are associated with a particular review. The deep learning model learns from code snippets and their surrounding context to solve the binary classification problem of predicting whether a review is relevant to a particular code snippet. In this manner, the technique is adaptable to any type of code review since it learns from the historical review data and not from pre-configured rules.

Exemplary Operating Environment

Figure 7:
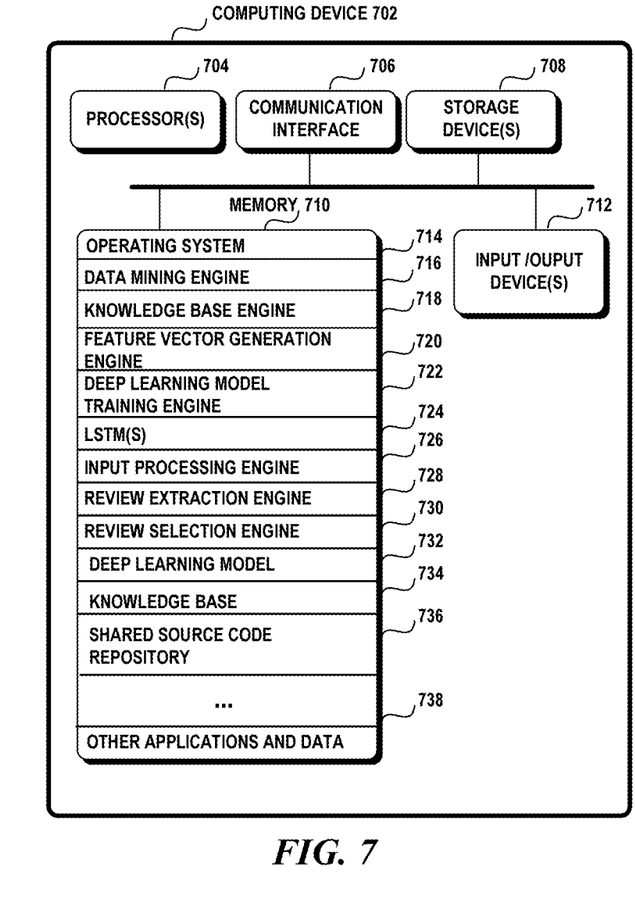
FIG. 7 is a block diagram illustrating a first exemplary operating environment.

Attention now turns to a discussion of a first exemplary operating embodiment. FIG. 7 illustrates a first exemplary operating environment 700 that includes at least one computing device 702. The computing device 702 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 700 may be configured in a network environment, a distributed environment, a multi-processor environment, or a stand-alone computing device having access to remote or local storage devices.

A computing device 702 may include one or more processors 704, a communication interface 706, one or more storage devices 708, one or more input and output devices 712, and a memory 710. A processor 704 may be any commercially available or customized processor and may include dual microprocessors and multi-processor architectures. The communication interface 706 facilitates wired or wireless communications between the computing device 702 and other devices. A storage device 708 may be a computer-readable medium that does not contain propagating signals, such as modulated data signals transmitted through a carrier wave. Examples of a storage device 708 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 708 in the computing device 702. The input/output devices 712 may include a keyboard, mouse, pen, voice input device, touch input device, display, speakers, printers, etc., and any combination thereof.

The memory 710 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 710 may also include one or more external storage devices or remotely located storage devices that do not pertain to propagated signals, such as modulated data signals transmitted through a carrier wave.

The memory 710 may contain instructions, components, and data. A component is a software program that performs a specific function and is otherwise known as a module, program, engine, and/or application. The memory 710 may include an operating system 714, a data mining engine 716, a knowledge base engine 718, a feature vector generation engine 720, a deep learning model training engine 722, LSTMs 724, input processing engine 726, review extraction engine 728, review selection engine 730, deep learning model 732, a knowledge base 734, shared source code repository 736 and other applications and data 738.

Figure 8:
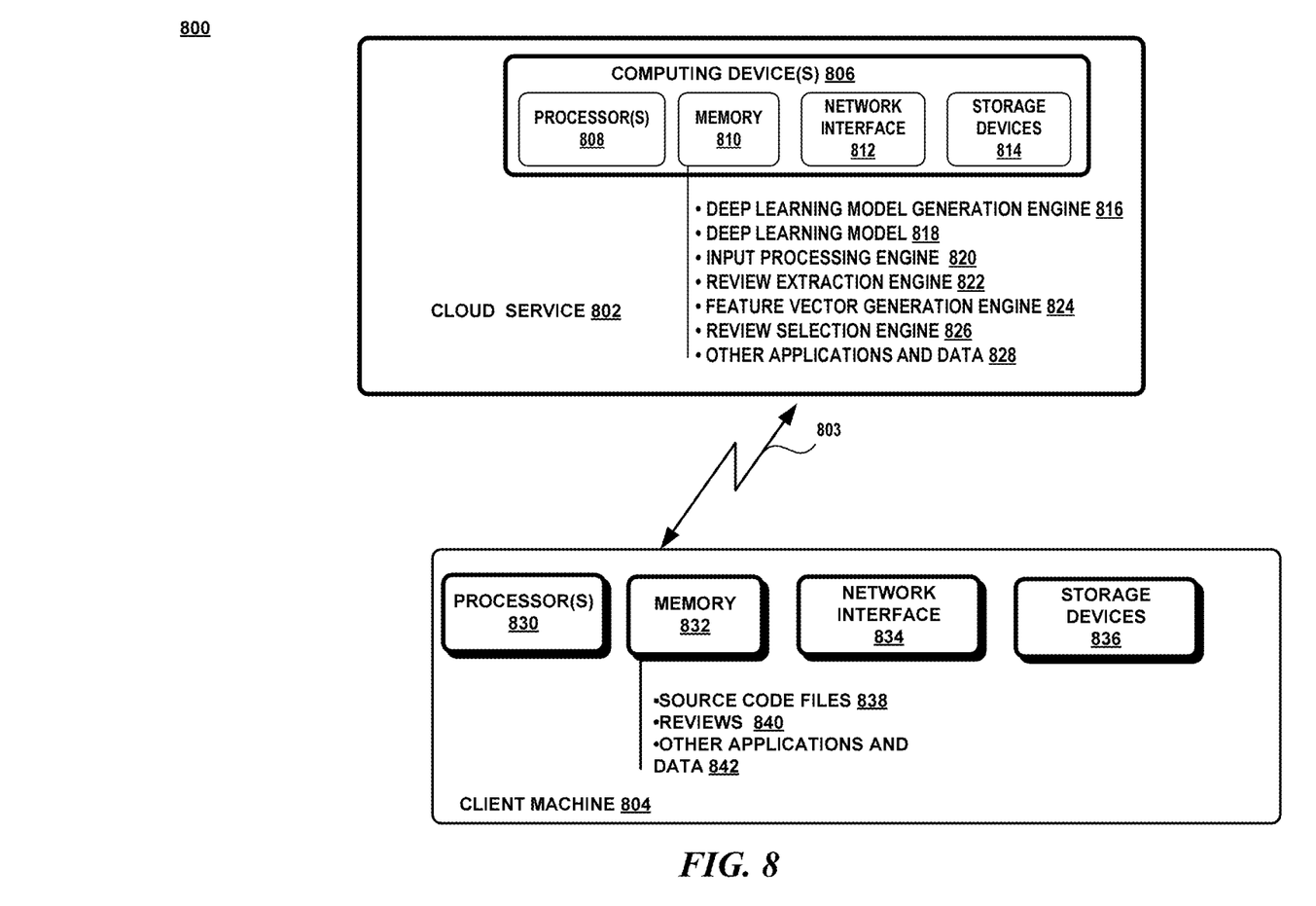
FIG. 8 is a block diagram illustrating a second exemplary operating environment.

FIG. 8 illustrates a second exemplary operating environment 800 that includes a cloud service 802 connected via a network 803 to a client machine 804. The cloud service 802 provides a code review service for developers. The cloud service 802 may train a deep learning model and offer a code review service that developers utilize to analyze various source code files.

The cloud service 802 may include one or more computing devices 806. The computing device 806 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 800 may be configured in a network environment, a distributed environment, a multi-processor environment, or a stand-alone computing device having access to remote or local storage devices.

A computing device 806 may include one or more processors 808, memory 810, a network interface 812 and storage devices 814 as described above. The memory 810 may contain instructions, components, and data. A component is a software program that performs a specific function and is otherwise known as a module, program, engine, and/or application. The memory 810 may include a deep learning model generation engine 816, a deep learning model 818, an input processing engine 820, a review extraction engine 822, a feature vector generation engine 824, a review selection engine 826 and other applications and data 828.

The network 803 facilitates communications between the cloud service 802 and the client machine 804. The network 803 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators).

The client machine 804 is a computing device as described above. The client machine 804 may include one or more processors 830, a memory 832, a network interface 834 and storage devices 836 as described above. The client machine 804 may be utilized by developers or users who subscribe to the cloud service 802 to obtain code reviews for source code. The memory 832 may include source code files 838, reviews of source code files 840 and other applications and data 842.

CONCLUSION

A system is disclosed that includes one or more processors, a memory, and one more modules. The one or more modules are configured to be executed by the one or more processors to perform actions that extract features representing an input source code snippet, the features including a syntactic context of the input source code snippet, obtain one or more code reviews having a close similarity to the input source code snippet and the syntactic context of the input source code snippet, input the extracted features and the one or more code reviews into a deep learning model to associate a probability for the one or more code reviews, the probability indicating a likelihood the code review is relevant to the input source code snippet, and select at least one code review for the input source code snippet based on a corresponding probability.

The syntactic content of the input source code snippet includes a portion of source code immediately preceding the input source code snippet and a portion of source code immediately following the input source code snippet. The one or more processors perform further actions that utilize a first neural network to generate an encoded representation of the input source code snippet, a second neural network to generate an encoded representation of the portion of source code immediately preceding the input source code snippet, a third neural network to generate an encoded representation of the portion of source code immediately succeeding the input source code snippet, and a fourth neural network to generate an encoded representation of the one or more code reviews. The first neural network, the second neural network, the third neural network and the fourth neural network are long short-term memory networks and the deep learning model is a neural network.

The one or more processors perform further actions that search a knowledge base of code-review pairs for the one or more code reviews, wherein the knowledge base is constructed from historical pull requests and obtain the one or more code reviews based on a cosine similarity test.

A device is disclosed that includes at least one processor and a memory. The at least one processor performs actions that receives an input code snippet containing one or more source code lines, obtains an upper context and a lower context corresponding to the input code snippet, utilizes a first long short-term memory (LSTM) network to generate a representation of the input code snippet, a second LSTM to generate a representation of the upper context, a third LSTM to generate a representation of the lower context, searches a knowledge base for one or more code reviews that are likely to be relevant to the input code snippet, utilizes a fourth LSTM to generate a representation of the one or more code reviews, combines the representations from the first LSTM, the second LSTM, third LSTM and fourth LSTM into a feature vector, applies the feature vector to a deep learning model, obtains a probability score from the deep learning model for each of the one or more code reviews, and accesses select ones of the one or more code reviews to associate with the input code snippet.

The at least one processor performs additional actions that searches the knowledge base for the one or more code reviews likely to be relevant based the one or more code reviews having closely matching code snippet, upper context, and lower context as the input code snippet, and employs a cosine similarity test to search the knowledge base for the one or more code reviews. The at least one processor performs additional actions that generates an encoded representation of the input code snippet, the upper context and the lower context based on code tokens, generates an encoded representation of the one or more code reviews based on review tokens, and utilizes the encoded representations in the feature vector. The at least one processor may perform actions that accesses the select ones of the one or more code reviews based on a corresponding probability score and accesses the select ones of the one or more code reviews based on an associated probability score within one or more different bands of a probability distribution. The deep learning model is a neural network.

A method that may be utilized by the system and device disclosed herein comprises actions for obtaining a plurality of code snippet and code review pairs, extracting a plurality of features from the plurality of code snippet and code review pairs, a feature including an upper context, a lower context, a code snippet and a code review, generating encoded representations for each feature using a plurality of neural networks, combining the encoded representations of each feature into a respective feature vector, using a deep learning model to learn associations between encoded representations of the code snippet, lower context and upper context of the feature vectors with the code reviews from the feature vectors, and employing the deep learning model to associate a probability score from the learned associations that indicates a likelihood that a select code review is relevant to a select code snippet.

The method further comprises actions for generating the code snippet and code review pairs from historical code reviews of a shared source code repository, generating a relevant training dataset and a non-relevant training dataset, the relevant training dataset including feature vectors having a code review associated with a code snippet, the non-relevant training dataset including feature vectors having a code review not associated with a code snippet, and training the deep learning model with feature vectors from the relevant training dataset and feature vectors from the non-relevant training dataset. Additional actions include obtaining a select number of lines of source code statements preceding a code snippet as the upper context, and obtaining a select number of lines of source code statements succeeding a code snippet as the lower context. More actions include generating a vector representing additional context data and adding the vector into a feature vector. Each of the neural networks may comprise a long short-term memory network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   one or more processors and a memory;
   one or more modules, wherein the one or more modules are configured to be executed by the one or more processors to perform actions that:
   obtain a source code program having a plurality of source code snippets;
   extract features representing an input source code snippet, the features including a context of the input source code snippet, wherein the context includes source code surrounding the input source code snippet in the source code program;
   search a knowledge base having a plurality of source code snippets and corresponding code reviews, each source code snippet paired with a corresponding code review;
   select from the knowledge base one or more code reviews having a close similarity to the input source code snippet and to the extracted features of the input source code snippet; and
   input a representation of the extracted features and the one or more code reviews into a deep learning model to generate a probability for each of the one or more code reviews, the probability indicating a likelihood that a particular one of the one or more code reviews is relevant to the input source code snippet; and
   select at least one code review from the one or more code reviews for the input source code snippet based on the corresponding probability that the at least one code review is relevant to the input source code snippet.

2. The system of claim 1, wherein the context of the input source code snippet includes a portion of source code immediately preceding the input source code snippet and a portion of source code immediately following the input source code snippet.

3. The system of claim 2, wherein the one or more processors perform further actions that:
   utilize a first neural network to generate an encoded representation of the input source code snippet, a second neural network to generate an encoded representation of the portion of source code immediately preceding the input source code snippet, a third neural network to generate an encoded representation of the portion of source code immediately succeeding the input source code snippet, and a fourth neural network to generate an encoded representation of the one or more code reviews.

4. The system of claim 3, wherein the first neural network, the second neural network, the third neural network and the fourth neural network are long short-term memory networks.

5. The system of claim 1, wherein the deep learning model comprises a plurality of Long-Short Term Memory (LSTM) models.

6. The system of claim 1, wherein the one or more processors perform further actions that select the one or more code reviews based on a cosine similarity test.

7. The system of claim 1, wherein the deep learning model is a neural network.

8. A method performed on a computing device having at least one processor and a memory, the method comprising:
   obtaining a plurality of code snippet and code review pairs, wherein a code snippet and code review pair includes a source code snippet and a corresponding code review, wherein a code review includes one or more comments pertaining to a review of the code snippet;
   extracting a plurality of features from the plurality of code snippet and code review pairs, a feature including an upper context, a lower context, a code snippet and a code review;
   generating encoded representations for each feature using a plurality of neural networks;
   combining the encoded representations of each feature into a respective feature vector;
   using a deep learning model to learn associations between encoded representations of the code snippet, lower context and upper context of the feature vectors with the code reviews from the feature vectors; and employing the deep learning model to associate a probability score from the learned associations that indicates a likelihood that a select code review is relevant to a select code snippet.

9. The method of claim 8, further comprising:

generating the code snippet and code review pairs from historical code reviews of a shared source code repository.

10. The method of claim 8, further comprising:

generating a relevant training dataset and a non-relevant training dataset, the relevant training dataset including feature vectors having a code review associated with a code snippet, the non-relevant training dataset including feature vectors having a code review not associated with a code snippet; and training the deep learning model with feature vectors from the relevant training dataset and feature vectors from the non-relevant training dataset.

11. The method of claim 8, further comprising:

obtaining a select number of lines of source code statements preceding a code snippet as the upper context; and obtaining a select number of lines of source code statements succeeding a code snippet as the lower context.

12. The method of claim 8, wherein each of the neural networks of the plurality of neural networks comprises a long short-term memory network.

13. The method of claim 8, further comprising:

generating a vector representing additional context data; and adding the vector into a feature vector.

14. A device, comprising:

at least one processor and a memory;

wherein the at least one processor performs actions that:

receives an input code snippet containing one or more source code lines;

obtains an upper context and a lower context corresponding to the input code snippet, wherein the upper context includes one or more source code lines that precede the input code snippet, wherein the lower context includes one or more source code lines that follow the input code snippet;

utilizes a first long short-term memory (LSTM) network to generate a representation of the input code snippet, a second LSTM network to generate a representation of the upper context, a third LSTM network to generate a representation of the lower context;

searches a knowledge base for one or more code reviews that are likely to be relevant to the input code snippet, wherein a code review includes one or more comments pertaining to a review of the input code snippet;

utilizes a fourth LSTM network to generate a representation of the one or more code reviews;

combines the representations from the first LSTM network, the second LSTM network, third LSTM network and fourth LSTM network into a feature vector;

applies the feature vector to a deep learning model;

obtains a probability score from the deep learning model for each of the one or more code reviews; and accesses select ones of the one or more code reviews to associate with the input code snippet based on a high probability score.

15. The device of claim 14, wherein the at least one processor performs actions that:

searches the knowledge base for the one or more code reviews likely to be relevant based the one or more code reviews having closely matching code snippet, upper context, and lower context as the input code snippet.

16. The device of claim 15, wherein the at least one processor performs actions that:

employs a cosine similarity test to search the knowledge base for the one or more code reviews.

17. The device of claim 14, wherein the at least one processor performs actions that:

generates an encoded representation of the input code snippet, the upper context and the lower context based on code tokens;

generates an encoded representation of the one or more code reviews based on review tokens; and utilizes the encoded representations in the feature vector.

18. The device of claim 14, wherein the at least one processor performs actions that:

accesses the select ones of the one or more code reviews based on a corresponding probability score.

19. The device of claim 14, wherein the at least one processor performs actions that:

accesses the select ones of the one or more code reviews based on an associated probability score within one or more different bands of a probability distribution.

20. The device of claim 14, wherein the deep learning model is a neural network.

* * * * *